United States Patent
Nakata et al.

(10) Patent No.: US 10,281,699 B2
(45) Date of Patent: May 7, 2019

(54) MICROSCOPE SYSTEM CONFIGURED TO IRRADIATE FOCUSED LIGHT ONTO AN AREA OF A SPECIMEN OUTSIDE OF AN OPTICAL AXIS OF AN OBJECTIVE LENS

(71) Applicant: OLYMPUS CORPORATION, Hachioji-shi, Tokyo (JP)

(72) Inventors: Tatsuo Nakata, Tokyo (JP); Atsushi Doi, Tokyo (JP); Kentaro Imoto, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/683,980

(22) Filed: Aug. 23, 2017

(65) Prior Publication Data
US 2018/0059397 A1 Mar. 1, 2018

(30) Foreign Application Priority Data

Aug. 29, 2016 (JP) .................................. 2016-167334

(51) Int. Cl.
*G02B 21/00* (2006.01)
*G02B 21/06* (2006.01)
*G02B 21/24* (2006.01)

(52) U.S. Cl.
CPC ..... *G02B 21/0032* (2013.01); *G02B 21/0044* (2013.01); *G02B 21/0048* (2013.01); *G02B 21/06* (2013.01); *G02B 21/24* (2013.01)

(58) Field of Classification Search
CPC ................ G02B 21/0032; G02B 21/06; G02B 21/0044; G02B 21/0048
USPC ........ 359/383, 385, 387–391, 393, 394, 666
See application file for complete search history.

(56) References Cited

U.S. PATENT DOCUMENTS

| | | | |
|---|---|---|---|
| 6,094,300 A | 7/2000 | Kashima et al. | |
| 7,170,676 B2 * | 1/2007 | Aono | G02B 21/06 359/385 |
| 8,040,597 B2 * | 10/2011 | Sasaki | G02B 21/0032 359/388 |
| 2003/0002148 A1 | 1/2003 | Engelhardt | |

(Continued)

FOREIGN PATENT DOCUMENTS

| | | |
|---|---|---|
| JP | 2003524194 A | 8/2003 |
| JP | 3917731 B2 | 5/2007 |

(Continued)

OTHER PUBLICATIONS

Jérôme Lecoq, et al., "Visualizing mammalian brain area interactions by dual-axis two-photon calcium imaging," Nature Neuroscience Technical Reports, vol. 17, No. 12, Dec. 2014, pp. 1825-1831.

*Primary Examiner* — Frank G Font
(74) *Attorney, Agent, or Firm* — Holtz, Holtz & Volek PC

(57) ABSTRACT

A microscope system includes an objective lens that focuses, on a specimen, illumination light produced by a light source. An illumination-area switching mechanism is disposed between the objective lens and the specimen and switches an illumination area irradiated with the illumination light focused by the objective lens among a plurality of illumination areas on the specimen that are located outside an objective optical axis of the objective lens. An inner focus lens is disposed on the objective optical axis between the light source and the objective lens and changes a focus position of the objective lens in a direction along the objective optical axis.

31 Claims, 8 Drawing Sheets

(56) References Cited

U.S. PATENT DOCUMENTS

| | | | |
|---|---|---|---|
| 2004/0196549 A1* | 10/2004 | Aono | G02B 21/06 359/388 |
| 2008/0225388 A1* | 9/2008 | Hirata | G02B 21/002 359/385 |
| 2009/0002815 A1* | 1/2009 | Hoult | G01N 21/552 359/391 |
| 2011/0026113 A1* | 2/2011 | Paulus | G02B 21/082 359/387 |
| 2014/0333998 A1* | 11/2014 | Kohli | G02B 21/02 359/391 |
| 2017/0108683 A1 | 4/2017 | Miyazono et al. | |
| 2018/0039055 A1* | 2/2018 | Arbore | G02B 21/0016 |

FOREIGN PATENT DOCUMENTS

| | | | |
|---|---|---|---|
| JP | 2017076095 A | 4/2017 | |
| WO | WO-2016106368 A1 * | 6/2016 | G02B 21/0016 |

* cited by examiner

FIG. 10

|  | GFP | RFP |
|---|---|---|
| Area 10 | EXTERNAL PMT 61A | PMT 79B |
| Area 20 | PMT 79A | EXTERNAL PMT 61B |

MICROSCOPE SYSTEM CONFIGURED TO IRRADIATE FOCUSED LIGHT ONTO AN AREA OF A SPECIMEN OUTSIDE OF AN OPTICAL AXIS OF AN OBJECTIVE LENS

CROSS-REFERENCE TO RELATED APPLICATIONS

This application is based on Japanese Patent Application No. 2016-167334, the contents of which are incorporated herein by reference.

TECHNICAL FIELD

The present invention relates to a microscope system.

BACKGROUND ART

In basic research on brain science, elucidation of the function of information transmission between cells in multiple areas has been conventionally an important research project. Although there is an observation method for allowing multiple areas to be observed by moving a stage, multiple areas cannot be simultaneously observed or observed by rapidly switching among them by moving the stage. In contrast to this, for example, in the laser-scanning microscope disclosed in PTL 1, the light paths of two independent scanning optical systems are combined, and illumination light is radiated onto a specimen via a single objective lens, thereby simultaneously observing two different areas.

CITATION LIST

Patent Literature

{PTL 1} Publication of Japanese Patent No. 3917731

SUMMARY OF INVENTION

Solution to Problem

According to a first aspect, the present invention provides a microscope system including: an objective lens that focuses, on a specimen, illumination light produced by a light source; an illumination-area switching unit that is disposed between the objective lens and the specimen and that switches an illumination area irradiated with the illumination light focused by the objective lens, among a plurality of illumination areas on the specimen outside the objective optical axis of the objective lens; and a variable-focus optical system that is disposed on the objective optical axis between the light source and the objective lens and that can change the focus position of the objective lens in a direction along the objective optical axis.

According to a second aspect, the present invention provides a microscope system including: an objective lens that focuses illumination light produced by a light source; and a light-path splitting unit that spatially splits the light path of the illumination light focused by the objective lens and that radiates the illumination light onto an area on a specimen on the objective optical axis of the objective lens and an area thereon outside the objective optical axis thereof.

BRIEF DESCRIPTION OF DRAWINGS

FIG. 10 is a view showing PMTs determined on the basis of the relationships between observation areas on the specimen and the wavelengths of fluorescence.

DESCRIPTION OF EMBODIMENTS

First Embodiment

A microscope system according to a first embodiment of the present invention will be described below with reference to the drawings.

Figure 1:
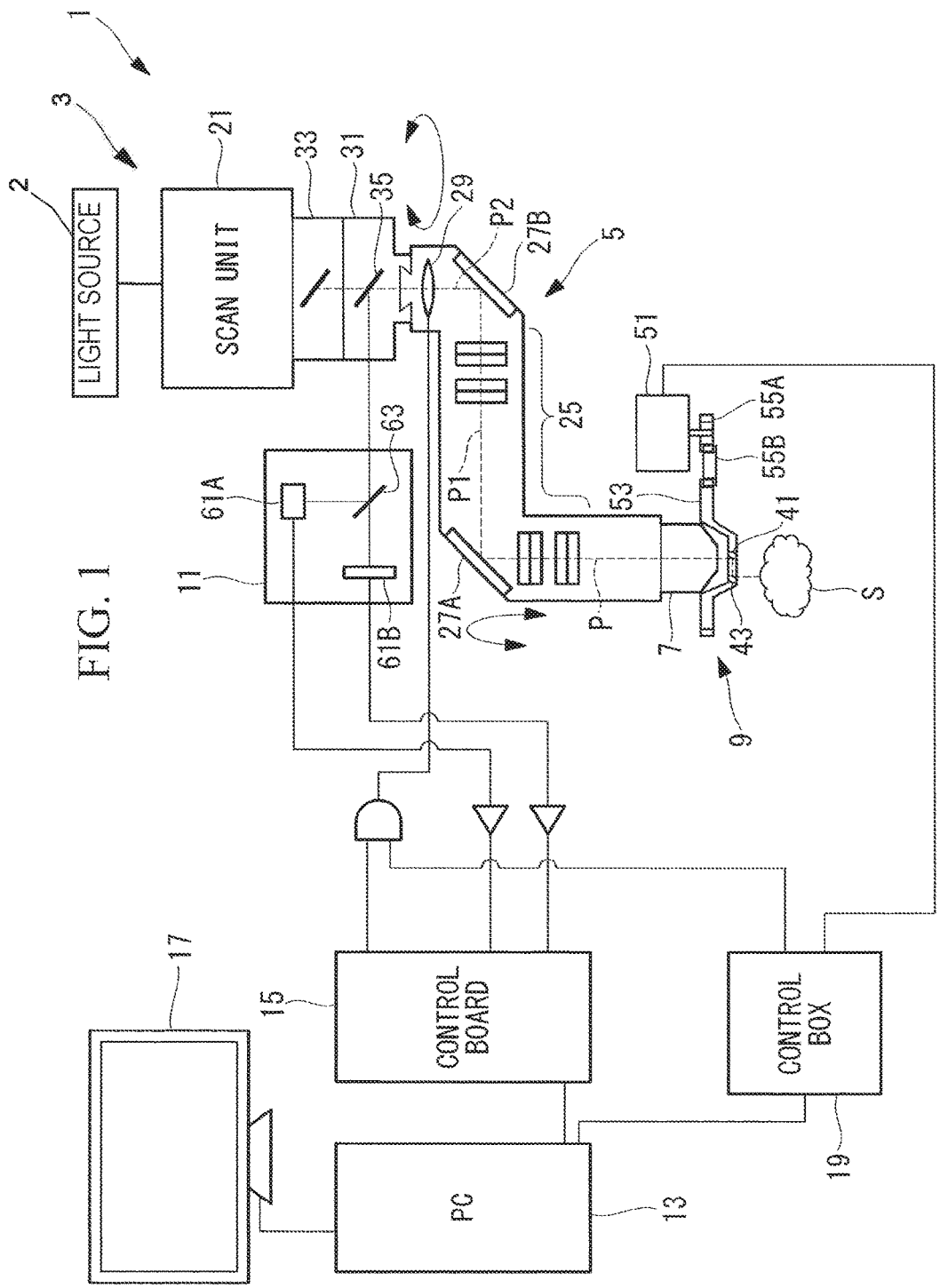
FIG. 1 is a view showing, in outline, the configuration of a microscope system according to a first embodiment of the present invention.

As shown in FIG. 1, the microscope system 1 of this embodiment is provided with: a microscope 3 that is provided with a light source 2 and a scan unit (scanning unit) 21; an inner focus unit 5 that is connected to the microscope 3; an objective lens 7 that is provided at a distal end of the inner focus unit 5; an illumination-area switching mechanism (Illumination-area switching unit) 9 that switches among illumination areas irradiated with laser light (illumination light) focused by the objective lens 7; an external detection device (detection unit) 11 that is connected to the microscope 3; a PC (personal computer) 13 that outputs control signals and that generates an image; a control board 15 that drives various electric parts on the basis of control signals from the PC 13; a monitor (display unit) 17 that displays an image etc. generated by the PC 13; and a control box 19.

Figure 2:
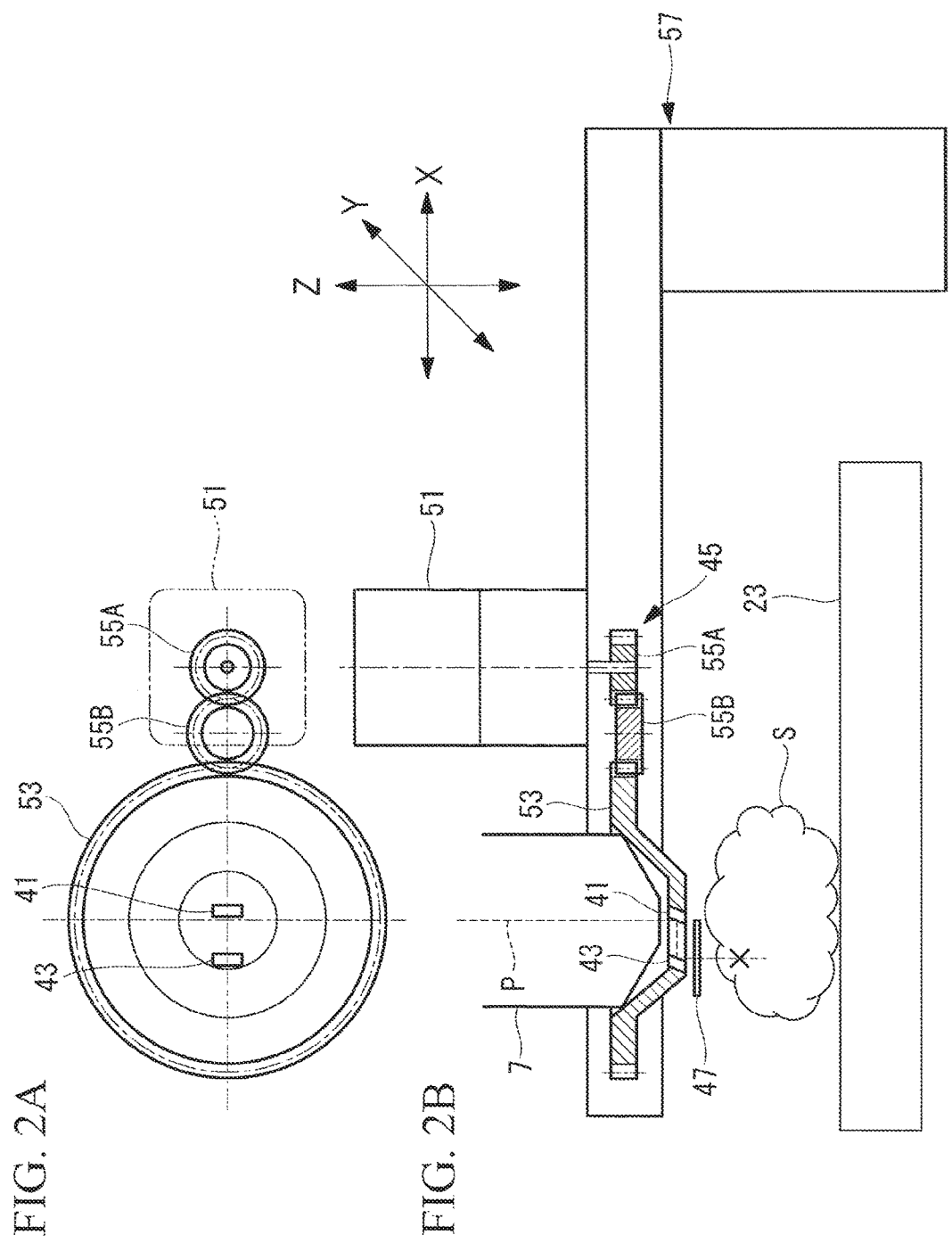
FIG. 2A is a cross-sectional view of the surroundings of an illumination-area switching mechanism shown in FIG. 1, taken in a direction perpendicular to an objective optical axis.
FIG. 2B is a cross-sectional view of the surroundings of the illumination-area switching mechanism shown in FIG. 1, taken in a direction along the objective optical axis.

The microscope 3 is, for example, a two-photon laser-scanning microscope or a laser-scanning microscope that includes a Galvanometer scanner as the scan unit 21 or is a disk-scanning confocal microscope that includes, as the scan unit 21, a pinhole array disk having a plurality of pinholes. As shown in FIG. 2B, the microscope 3 is provided with a tilt/rotation XY stage 23 on which a specimen S is placed, and is fixed to an anti-vibration table (not shown).

Figure 3:
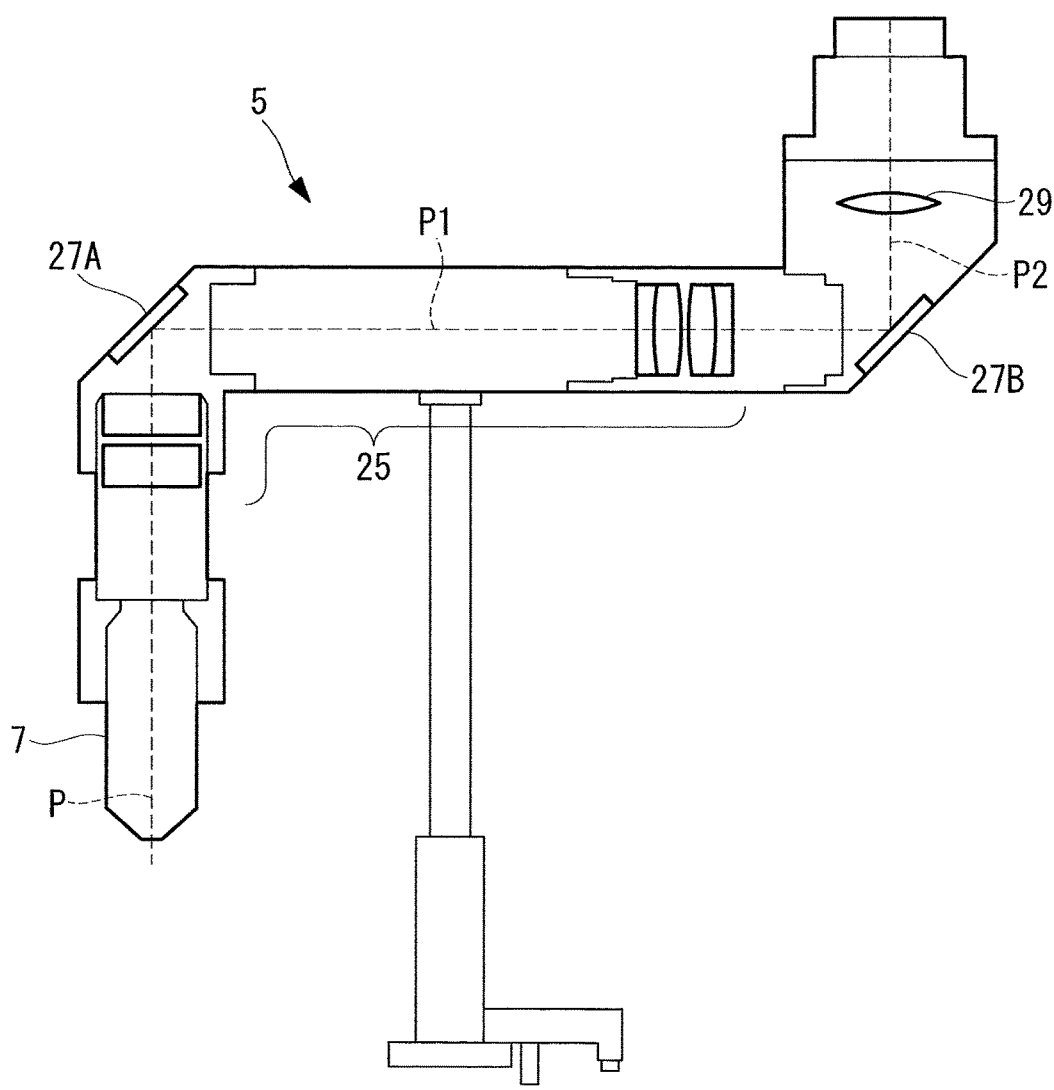
FIG. 3 is a longitudinal cross-sectional view of an inner focus unit shown in FIG. 1.

As shown in FIGS. 1 and 3, the inner focus unit 5 is provided with: a relay optical system 25 that relays fluorescence (observation light) from the specimen S, collected by the objective lens 7; reflection mirrors 27A and 27B that reflect the fluorescence relayed by the relay optical system 25; and an inner focus lens (ETL: electrically tunable lens, variable-focus optical system) 29.

The inner focus lens 29 can change the focus position of the objective lens 7 at high speed in the direction along an objective optical axis P on the basis of a drive signal from the control board 15, without mechanically moving the structures located in the vicinity of the specimen S, such as the objective lens 7 and the tilt/rotation XY stage 23.

Furthermore, the inner focus unit 5 is connected to a revolving arm 31 that includes a beam splitter 35 and is connected to the scan unit 21 of the microscope 3 via a cube turret 33. The beam splitter 35 in the revolving arm 31 transmits laser light from the light source and reflects fluorescence returning from the specimen S via the inner focus unit 5, toward the external detection device 11.

Furthermore, the inner focus unit 5 is provided in a manner allowing it to be rotated about a rotational axis parallel to the objective optical axis P of the objective lens 7 and about a rotational axis intersecting the objective optical axis P thereof, by means of an objective movement mechanism (not shown). For example, as shown in FIGS. 1 and 3, the inner focus unit 5 can be rotated about, as the rotational axis, an optical axis P2 that is parallel to the objective optical axis P of the objective lens 7 or an optical axis P1 that intersects the objective optical axis P of the objective lens 7. Specifically, the inner focus unit 5 can be rotated about, as the rotational axis, at least one optical axis along which the objective optical axis P extends. Accordingly, the objective lens 7 is rotated about the rotational axis parallel to the objective optical axis P and about the rotational axis intersecting the objective optical axis P, thereby making it possible to observe the specimen S from various directions.

As shown in FIGS. 2A and 2B, the illumination-area switching mechanism 9 is provided with: a first mirror 41 that is disposed on the objective optical axis P of the objective lens 7; a second mirror 43 that is disposed outside the objective optical axis; and a mirror movement mechanism 45 that moves the first mirror 41 and the second mirror 43 while maintaining the light path of laser light therebetween. Reference sign 47 denotes a cover glass disposed between the second mirror 43 and the specimen S.

The first mirror 41 is disposed on the objective optical axis P, thereby reflecting laser light focused by the objective lens 7 toward the outside of the objective optical axis.

The second mirror 43 is disposed outside the objective optical axis, thereby reflecting the laser light reflected by the first mirror 41, which is disposed on the objective optical axis P, toward an area on the specimen S outside the objective optical axis.

The mirror movement mechanism 45 is provided with: a stepping motor 51; a holding arm 53 that holds the first mirror 41 and the second mirror 43; and two spur gears 55A and 55B that convey power of the stepping motor 51 to the holding arm 53.

Figure 4:
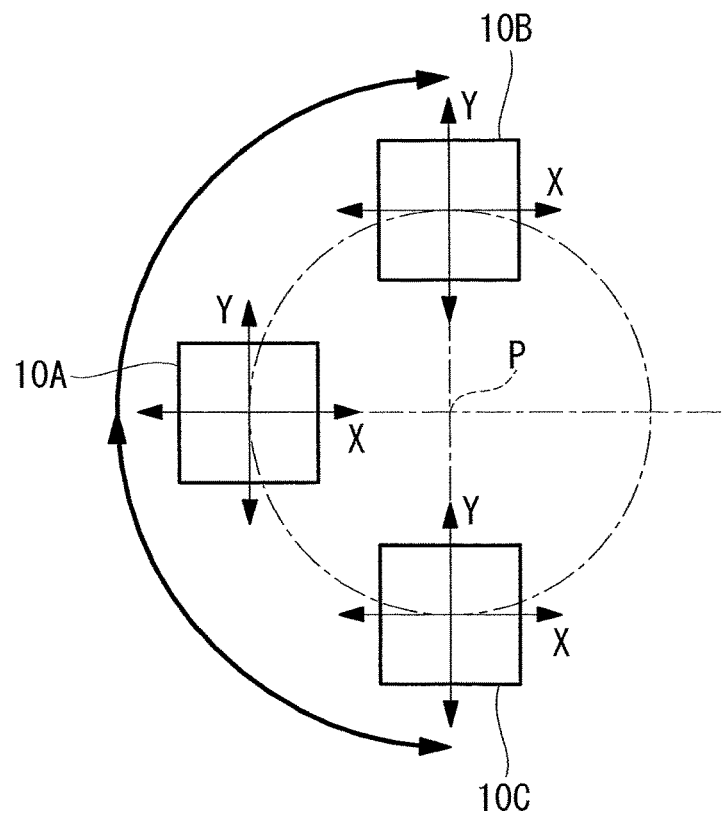
FIG. 4 is a view showing example observation areas outside the objective optical axis.

Through actuation of the stepping motor 51, the mirror movement mechanism 45 can rotate the second mirror 43 about the objective optical axis P, while rotating the first mirror 41 about the objective optical axis P, via the spur gears 55A and 55B and the holding arm 53. Accordingly, in association with the rotation of the second mirror 43 about the objective optical axis P, for example, as shown in FIG. 4, the illumination area on the specimen S outside the objective optical axis, the illumination area being irradiated with laser light via the second mirror 43, can be changed around the objective optical axis P.

Area 10R, Area 10B, and Area 10C are illustrated as example laser-light illumination areas outside the objective optical axis that are to be switched around the objective optical axis P. Note that the illumination areas, i.e., Area 10A, Area 10B, and Area 10C, each correspond to an area on which the scan unit 21 can scan laser light and an area that can be imaged, in a state in which the mirror movement mechanism 45 is stopped at the corresponding rotational position. Furthermore, the size of each of the illumination areas corresponds to that of an area (the field of view) that is formed on the objective optical axis P in a state in which the illumination-area switching mechanism 9 is removed by a support post 57, to be described later, and that can be illuminated and imaged through scanning performed by the scan unit 21.

The stepping motor 51 is suspended from an XYZ rack and pinion for positioning (not shown). The XYZ rack and pinion is fixed to the support post (insertion/removal-switching support portion) 57 (see FIG. 2B), which is independent from the microscope 3 fixed to the anti-vibration table.

The support post 57 supports the illumination-area switching mechanism 9 to be inserted in and removed from the objective optical axis P of the objective lens 7. When the illumination-area switching mechanism 9 is inserted to dispose the first mirror 41 in the objective optical axis P, laser light focused by the objective lens 7 is reflected by the first mirror 41 and the second mirror 43, thus being radiated outside of the objective optical axis. When the illumination-area switching mechanism 9 is removed to remove the first mirror 41 from the objective optical axis P, laser light focused by the objective lens 7 is directly radiated along the objective optical axis P.

As shown in FIG. 1, the external detection device 11 is provided with: two external PMTs (photomultiplier tubes) 61A and 61B; and a dichroic mirror 63 that splits fluorescence coming from the beam splitter 35 in the revolving arm 31 into the two external PMTs 61A and 61B according to the wavelength. A luminance signal of the fluorescence detected by each of the external PMTs 61A and 61B is sent to the PC 13 via the control board 15.

The PC 13 generates an image of the specimen S on the basis of the luminance signal of the fluorescence sent from each of the external PMTs 61A and 61B. Furthermore, the PC 13 causes the control board 15 to output an ETL drive signal for driving the inner focus lens 29 and causes the control box 19 to output a drive signal for driving the stepping motor 51.

The control box 19 drives the stepping motor 51 in response to an instruction from the PC 13. Furthermore, when driving the stepping motor 51 to switch among Areas 10A, 10B, and 10C outside the objective optical axis, the control box 19 adds a difference signal of Area 10A, 10B, or 10C in the Z direction to the ETL drive signal output from the control board 15. Accordingly, in synchronization with the switching among the illumination areas outside the objective optical axis performed by the illumination-area switching mechanism 9, the inner focus lens 29 is actuated to adjust, for each of Areas 10A, 10B, and 10C, the focus position in the Z-direction.

The operation of the thus-configured microscope system 1 will be described.

In order to observe the specimen S by using the microscope system 1 of this embodiment, the observation position on the specimen S is switched between an area outside the objective optical axis and an area on the objective optical axis P through insertion and removal of the illumination-area switching mechanism 9.

To observe an area on the specimen S outside the objective optical axis, the illumination-area switching mechanism 9 is inserted between the objective lens 7 and the specimen S. In the state in which the illumination-area switching mechanism 9 is inserted therebetween, laser light produced by the light source and scanned by the scan unit 21 is focused by the objective lens 7 via the cube turret 33, the revolving arm 31, and the inner focus unit 5. The laser light focused by the objective lens 7 is reflected by the first mirror 41 and the second mirror 43 and is radiated onto the area on the specimen S outside the objective optical axis.

Fluorescence produced in the area on the specimen S outside the objective optical axis when the area is irradiated with the laser light is collected by the objective lens 7 via the second mirror 43 and the first mirror 41, then returns along the light path of the laser light via the inner focus unit 5, is reflected by the beam splitter 35 in the revolving arm 31, and enters the external detection device 11.

The fluorescence entering the external detection device 11 is split by the dichroic mirror 63 according to the wavelength and is detected by the external PMT 61A or the external PMT 61B. Then, the PC 13 generates a two-dimensional image of the area on the specimen S outside the objective optical axis on the basis of the luminance signal of the fluorescence detected by the external PMT 61A or 61B and displays the two-dimensional image on the monitor 17.

Next, the inner focus lens 29 changes, in the Z-direction, the focus position of the objective lens 7 at a predetermined pitch. Accordingly, it is possible to acquire two-dimensional images at respective Z-positions in the area on the specimen S outside the objective optical axis, thus allowing the area outside the objective optical axis to be observed three-dimensionally.

Next, the stepping motor 51 is driven to rotate the second mirror 43 about the objective optical axis P while rotating the first mirror 41 about the objective optical axis P, thus switching the observation area on the specimen S outside the objective optical axis among Areas 10A, 10B, and 10C, as shown in FIG. 4.

In this case, a user decides, in advance, respective Z-positions in Areas 10A, 10B, and 10C while drivingly adjusting the inner focus lens 29 and obtains difference signals of Areas 10A, 10B, and 10C in the Z-direction, from ETL drive signals corresponding to the Z-positions in Areas 10A, 10B, and 10C. Then, when the stepping motor 51 is driven to switch among Areas 10A, 10B, and 10C, the difference signal of the selected Area 10A, 10B, or 10C in the Z-direction is output from the control box 19 and is added to the ETL drive signal output from the control board 15. Accordingly, for each of Areas 10A, 10B, and 10C, the focus position can be sequentially changed in the Z-direction to perform three-dimensional observation.

Next, to observe an area on the specimen S on the objective optical axis P, the illumination-area switching mechanism 9 is removed from between the objective lens 7 and the specimen S. In the state in which the illumination-area switching mechanism 9 is removed therefrom, laser light produced by the light source and scanned by the scan unit 21 is focused by the objective lens 7 via the cube turret 33, the revolving arm 31, and the inner focus unit 5 and is radiated onto the area on the specimen S on the objective optical axis P.

Fluorescence produced in the area on the specimen S on the objective optical axis P when the area is irradiated with the laser light is collected by the objective lens 7, then returns along the light path of the laser light via the inner focus unit 5, is reflected by the beam splitter 35 in the revolving arm 31, enters the external detection device 11, and is detected by the external PMT 61A or the external PMT 61B via the dichroic mirror 63. Then, the PC 13 generates a two-dimensional image of the area on the specimen S on the objective optical axis P on the basis of the luminance signal of the fluorescence detected by the external PMT 61A or 61B and displays the two-dimensional image on the monitor 17.

Next, the inner focus lens 29 changes, in the Z-direction, the focus position of the objective lens 7 at the predetermined pitch, in the area on the specimen S on the objective optical axis P. Accordingly, it is possible to acquire two-dimensional images at respective Z-positions in the area on the specimen S on the objective optical axis P, thus allowing the area on the objective optical axis P to be observed three-dimensionally.

As described above, according to the microscope system 1 of this embodiment, simply by switching between insertion and removal of the illumination-area switching mechanism 9, the illumination area, on the specimen S, to be irradiated with laser light can be switched between an area on the objective optical axis P and at least one area (Area 10A, 10B, or 10C) outside the objective optical axis. Accordingly, a plurality of areas including the field of view outside the objective optical axis can be rapidly switched and observed on the basis of the fluorescence produced in each area, on the specimen S, irradiated with laser light. Furthermore, the focus position of the objective lens 7 is changed for each of the plurality of areas by means of the inner focus lens 29, thereby allowing each of the plurality of areas to be observed three-dimensionally.

Figure 5:
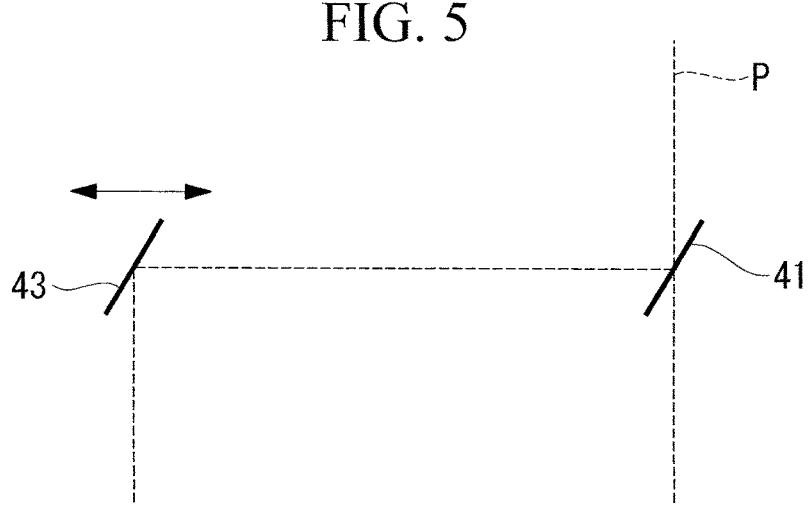
FIG. 5 is a view showing how a second mirror is moved in a direction perpendicular to the objective optical axis.

In this embodiment, as shown in FIG. 5, the mirror movement mechanism 45 may move the second mirror 43 in a direction perpendicular to the objective optical axis P. By doing so, a laser-light illumination area on the specimen S outside the objective optical axis can be changed in a direction perpendicular to the objective optical axis P.

For example, by moving the second mirror 43 in the direction close to the first mirror 41, an observation area outside the objective optical axis can be positioned close to the observation area on the objective optical axis P. On the other hand, by moving the second mirror 43 in the direction away from the first mirror 41, an observation area outside the objective optical axis can be positioned away from the observation area on the objective optical axis P.

Figure 6:
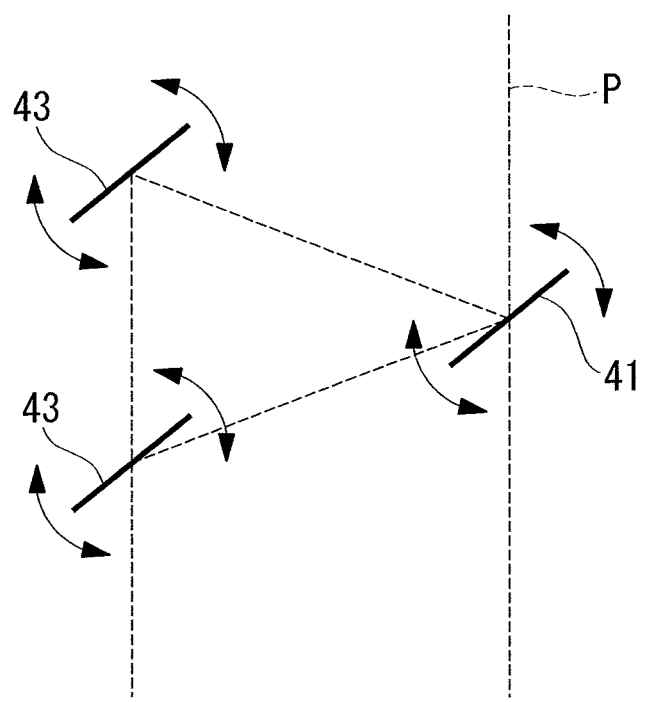
FIG. 6 is a view showing how the second mirror is moved in a direction along the objective optical axis and how the angles of a first mirror and the second mirror are changed.

Furthermore, in this embodiment, as shown in FIG. 6, the first mirror 41 and the second mirror 43 may be provided in a manner allowing the angles thereof to be changed. Furthermore, the mirror movement mechanism 45 may move at least one of the first mirror 41 and the second mirror 43 in the direction along the objective optical axis P.

By doing so, the mirror movement mechanism 45 moves at least one of the first mirror 41 and the second mirror 43 in the direction along the objective optical axis P and adjusts the angles of the first mirror 41 and the second mirror 43, thereby making it possible to change, in the depth direction, the focus position of the objective lens 7 in an illumination area on the specimen S outside the objective optical axis.

For example, when the second mirror 43 is moved along the objective optical axis P in a direction away from the specimen S, and the angles of the first mirror 41 and the second mirror 43 are adjusted, the focus position of the objective lens 7 in an illumination area on the specimen S outside the objective optical axis can be made shallow. Furthermore, when the second mirror 43 is moved along the objective optical axis P in a direction close to the specimen S, and the angles of the first mirror 41 and the second mirror 43 are adjusted, the focus position of the objective lens 7 in an illumination area on the specimen S outside the objective optical axis can be made deep.

Furthermore, in this embodiment, although the illumination-area switching mechanism 9 is supported by the support post 57, instead of this, for example, the illumination-area switching mechanism 9 may be fixed to the objective lens 7, and, when the inner focus unit 5 is rotated about the rotational axis parallel to the objective optical axis P and about the rotational axis intersecting the objective optical axis P, the illumination-area switching mechanism 9 may also be allowed to be integrally rotated with the objective lens 7.

In this case, for example, the holding arm 53 of the mirror movement mechanism 45 is fixed to the objective lens 7, and, with the holding arm 53, the whole illumination-area switching mechanism 9 is held by the objective lens 7. By doing so, when the inner focus unit 5 is rotated to change the orientation of the objective lens 7 for observation, it is unnecessary to remove the illumination-area switching mechanism 9, and, while changing the orientation of the objective lens 7, a plurality of areas outside the objective optical axis can be switched among by the illumination-area switching mechanism 9 and can be observed.

Second Embodiment

Next, a microscope system according to a second embodiment of the present invention will be described.

Figure 7:
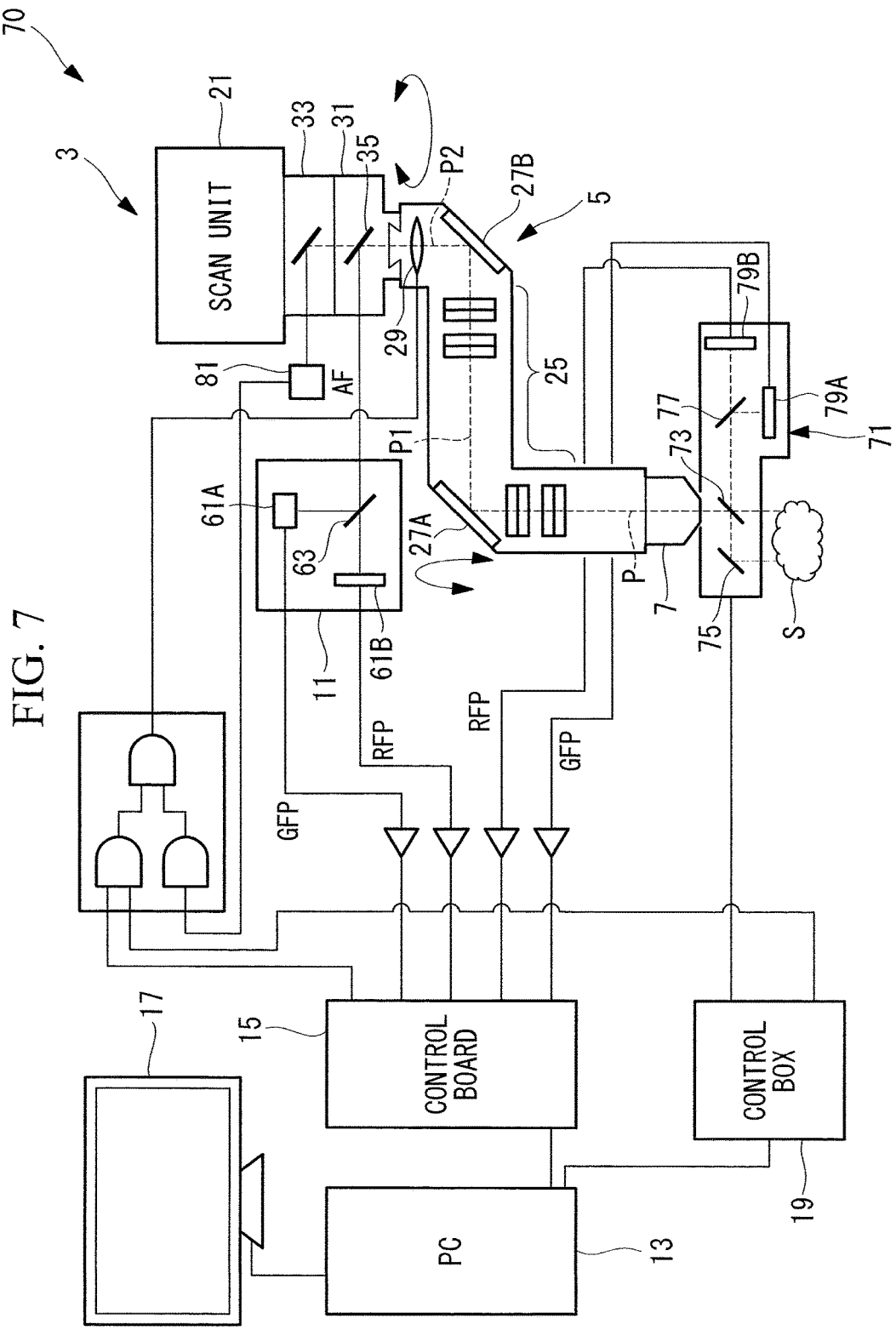
FIG. 7 is a view showing, in outline, the configuration of a microscope system according to a second embodiment of the present invention.

As shown in FIG. 7, a microscope system 70 of this embodiment differs from that of the first embodiment in that a light-path splitting mechanism (light-path splitting unit) 71 that simultaneously radiates laser light onto an area on the specimen S on the objective optical axis P and an area thereon outside the objective optical axis is provided instead of the illumination-area switching mechanism 9 and the support post 57.

In the following description, identical reference signs are assigned to portions having configurations common to those in the microscope system 1 of the first embodiment, and a description thereof will be omitted.

The light-path splitting mechanism 71 is provided with: a dichroic mirror 73 that is disposed on the objective optical axis P; a reflection mirror 75 that is disposed outside the objective optical axis; and a mirror movement mechanism (not shown) that moves the dichroic mirror 73 and the reflection mirror 75 while maintaining the light path of laser light therebetween.

The dichroic mirror 73 reflects laser light focused by the objective lens 7 in a direction intersecting the objective optical axis P or transmits the laser light in the direction along the objective optical axis P, according to the wavelength. Furthermore, the dichroic mirror 73 reflects or transmits, according to the wavelength, fluorescence from the specimen S returning, in the opposite direction, in the light path of laser light from the direction along the objective optical axis P and from the direction intersecting the objective optical axis P.

The reflection mirror 75 reflects laser light reflected by the dichroic mirror 73 in the direction intersecting the objective optical axis P, toward an area on the specimen S outside the objective optical axis and reflects fluorescence returning from the area on the specimen S outside the objective optical axis when the area is irradiated with the laser light, toward the dichroic mirror 73.

Figure 8:
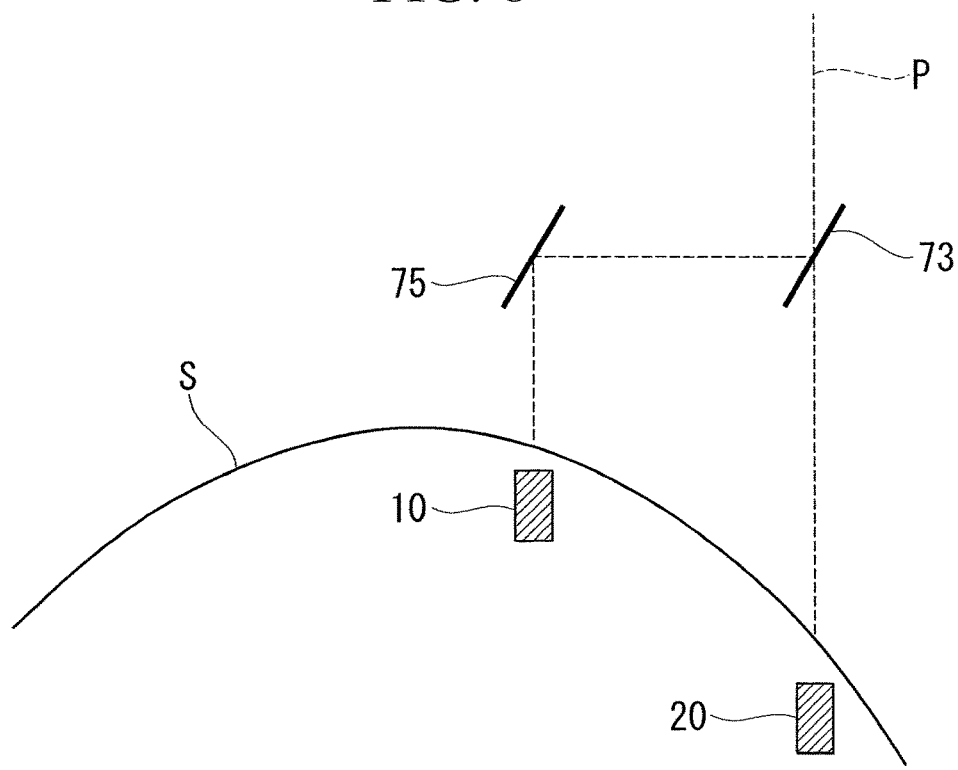
FIG. 8 is a view showing an example observation area on a specimen on the objective optical axis and an example observation area thereon outside the objective optical axis.

According to the light-path splitting mechanism 71, laser light transmitted through the dichroic mirror 73 in the direction along the objective optical axis P is directly radiated onto an area on the specimen S on the objective optical axis P, and laser light reflected by the dichroic mirror 73 in the direction intersecting the objective optical axis P is radiated onto an area on the specimen S outside the objective optical axis, via the reflection mirror 75. Hereinafter, as shown in FIG. 8, an illumination area outside the objective optical axis, the illumination area being irradiated with laser light via the reflection mirror 75, is referred to as Area 10, and an illumination area on the objective optical axis P, the illumination area being irradiated with laser light via the dichroic mirror 73, is referred to as Area 20.

The mirror movement mechanism has the same configuration as the mirror movement mechanism 45 of the first embodiment. This mirror movement mechanism can rotate the reflection mirror 75 about the objective optical axis P while rotating the dichroic mirror 73 about the objective optical axis P, through actuation of a stepping motor (not shown).

Furthermore, as shown in FIG. 7, the light-path splitting mechanism 71 is provided with: a dichroic mirror 77 that has the same transmission characteristics and reflection characteristics as the dichroic mirror 73; a PMT 79A that detects fluorescence reflected by the dichroic mirror 77; and a PMT 79B that detects fluorescence transmitted through the dichroic mirror 77. In FIG. 7, reference sign 81 denotes an autofocus sensor (AF) that is connected via the cube turret 33.

When the dichroic mirror 73 and the reflection mirror 75 are rotated about the objective optical axis P by the mirror movement mechanism, the dichroic mirror 77, the PMT 79A, and the PMT 79B are also rotated together while the light paths of fluorescence between the reflection mirror 75, the dichroic mirror 73, the dichroic mirror 77, the PMT 79A, and the PMT 79B are maintained.

Figure 9:
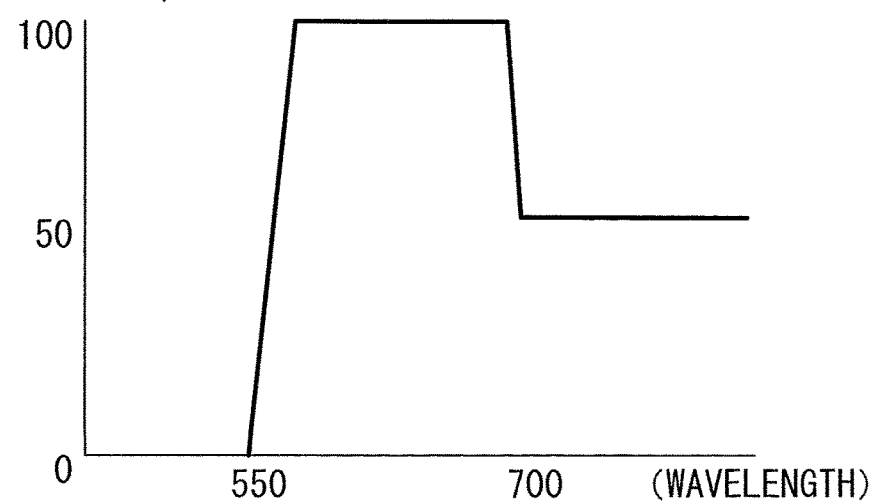
FIG. 9 is a view showing example reflection characteristics and transmission characteristics of a dichroic mirror.

The two dichroic mirrors 73 and 77 and the dichroic mirror 63 in the external detection device 11 each have transmission characteristics and reflection characteristics such that 100% of light at a wavelength of 550 nm or shorter is reflected, 100% of light at a wavelength longer than 550 nm and shorter than 700 nm is transmitted, 50% of light at a wavelength of 700 nm or longer is transmitted, and 50% thereof is reflected, for example, as shown in FIG. 9.

Note that, the light-path splitting mechanism 71 is fixed to the objective lens 7, and, when the inner focus unit 5 is rotated about the rotational axis parallel to the objective optical axis P and about the rotational axis intersecting the objective optical axis P, the light-path splitting mechanism 71 can also be rotated integrally with the objective lens 7.

The operation of the thus-configured microscope system 70 will be described.

To observe the specimen S by using the microscope system 70 of this embodiment, laser light produced by the light source and scanned by the scan unit 21 is focused by the objective lens 7 via the cube turret 33, the revolving arm 31, and the inner focus unit 5.

The laser light focused by the objective lens 7 is transmitted through the dichroic mirror 73 or is reflected by the dichroic mirror 73, according to the wavelength. As shown in FIG. 8, laser light reflected by the dichroic mirror 73 is reflected by the reflection mirror 75 and is radiated onto Area 10 on the specimen S outside the objective optical axis, and laser light transmitted through the dichroic mirror 73 is radiated onto Area 20 thereon on the objective optical axis P.

For example, when laser light at a wavelength of 920 nm and at a wavelength of 1040 nm is emitted from the light source, 50% of the laser light focused by the objective lens 7 is reflected by the dichroic mirror 73 and 50% thereof is transmitted through the dichroic mirror 73. Then, 50% of the laser light reflected by the dichroic mirror 73 is radiated onto Area 10 outside the objective optical axis via the reflection mirror 75, and, at the same time, 50% of the laser light transmitted through the dichroic mirror 73 is directly radiated onto Area 20 on the objective optical axis P. Accordingly, excitation occurs simultaneously in both Area 10 and Area 20 on the specimen S, and fluorescence is produced in them.

The fluorescence produced in Area 10 on the specimen S outside the objective optical axis is reflected by the reflection mirror 75 and is transmitted through the dichroic mirror 73 or is reflected by the dichroic mirror 73 according to the wavelength. Furthermore, the fluorescence produced in Area 20 on the specimen S on the objective optical axis P is transmitted through the dichroic mirror 73 or is reflected by the dichroic mirror 73 according to the wavelength.

The fluorescence from Area 10 transmitted through the dichroic mirror 73 and the fluorescence from Area 20 reflected by the dichroic mirror 73 are transmitted through the dichroic mirror 77 or are reflected by the dichroic mirror 77 according to the wavelength. The fluorescence reflected by the dichroic mirror 77 is detected by the PMT 79A, and the fluorescence transmitted through the dichroic mirror 77 is detected by the PMT 79B.

For example, as shown in FIG. 9, fluorescence, such as RFP (red fluorescent protein) at a wavelength longer than 550 nm, produced in Area 10 is reflected by the reflection mirror 75, is transmitted through the dichroic mirror 73 and the dichroic mirror 77, and is detected by the PMT 79B. Furthermore, fluorescence, such as GFP (green fluorescent protein) at a wavelength of 550 nm or shorter, produced in Area 20 is reflected by the dichroic mirror 73 and the dichroic mirror 77 and is detected by the PMT 79A.

Then, the PC 13 generates two-dimensional images of Area 10 on the specimen S outside the objective optical axis and Area 20 thereon on the objective optical axis P on the basis of the luminance signals of the fluorescence detected by the PMTs 79A and 79B and displays the two-dimensional images on the monitor 17.

On the other hand, the fluorescence from Area 10 reflected by the dichroic mirror 73 and the fluorescence from Area 20 transmitted through the dichroic mirror 73 are collected by the objective lens 7, return through the inner focus unit 5 in the opposite direction from the laser light, and are reflected by the beam splitter 35 in the revolving arm 31 toward the external detection device 11.

The fluorescence entering the external detection device 11 is reflected by the dichroic mirror 63 or is transmitted through the dichroic mirror 63 according to the wavelength. The fluorescence reflected by the dichroic mirror 63 is detected by the external PMT 61A, and the fluorescence transmitted through the dichroic mirror 63 is detected by the external PMT 61B.

For example, as shown in FIG. 9, fluorescence, such as GFP at a wavelength of 550 nm or shorter, produced in Area 10 is reflected by the reflection mirror 75 and the dichroic mirror 73, is focused by the objective lens 7, is reflected by the beam splitter 35 via the inner focus unit 5, is reflected by the dichroic mirror 63 in the external detection device 11, and is detected by the external PMT 61A. Furthermore, fluorescence, such as RFP at a wavelength longer than 550 nm, produced in Area 20 is transmitted through the dichroic mirror 73, is focused by the objective lens 7, is reflected by the beam splitter 35 via the inner focus unit 5, is transmitted through the dichroic mirror 63 in the external detection device 11, and is detected by the external PMT 61B.

Then, the PC 13 generates two-dimensional images of Area 10 on the specimen S outside the objective optical axis and Area 20 thereon on the objective optical axis P on the basis of the luminance signals of the fluorescence detected by the external PMTs 61A and 61B and displays the two-dimensional images on the monitor 17.

Here, the positions and the angles of the dichroic mirror 73 and the reflection mirror 75 are adjusted to align, in advance, the focus positions in Area 10 and Area 20. The inner focus lens 29 is actuated, thereby simultaneously moving the focus positions in both Area 10 and Area 20 by the same distance.

Therefore, the inner focus lens 29 changes, in the Z-direction, the focus position of the objective lens 7 at the predetermined pitch, in Area 10 on the specimen S outside the objective optical axis and Area 20 thereon on the objective optical axis P, thereby making it possible to simultaneously acquire two-dimensional images at each Z-position and to simultaneously and three-dimensionally observe Area 10 and Area 20.

As described above, according to the microscope system 70 of this embodiment, the light-path splitting mechanism 71 splits the light path of laser light produced by the light source and focused by the objective lens 7, thereby simultaneously radiating the laser light onto Area 20 on the objective optical axis P of the objective lens 7 and Area 10 outside the objective optical axis thereof. Accordingly, Areas 10 and 20 including the field of view outside the objective optical axis can be simultaneously observed on the basis of fluorescence produced in Areas 10 and 20 on the specimen that are irradiated with the laser light. Furthermore, the inner focus lens 29 changes the focus position of the objective lens 7 for each of Areas 10 and 20, thereby making it possible to simultaneously and three-dimensionally observe Areas 10 and 20.

In this embodiment, the dichroic mirrors 73 and 77 of the light-path splitting mechanism 71 and the dichroic mirror 63 of the external detection device 11 may have a transmittance of about 50% with respect to a near-infrared wavelength region, which corresponds to the wavelength of laser light for causing multiphoton excitation, and may have a transmittance of 80% or higher with respect to one of short-wavelength-side multiphoton fluorescence and long-wavelength-side multiphoton fluorescence and a transmittance of 20% or lower with respect to the other.

Furthermore, in this embodiment, the mirror movement mechanism may rotate the reflection mirror 75 about the objective optical axis P while rotating the dichroic mirror 73 about the objective optical axis P, thereby switching Area 10, which is located outside the objective optical axis, among Areas 10A, 10B, and 10C, as shown in FIG. 4.

In this case, because the dichroic mirror 77, the PMT 79A, and the PMT 79B are rotated, together with the dichroic mirror 73 and the reflection mirror 75, about the objective optical axis P while the light paths of fluorescence therebetween are maintained, it is possible to detect, by means of the PMT 79A or 79B, the fluorescence from each of Areas 10A, 10B, and 10C outside the objective optical axis, while switching among Areas 10A, 10B, and 10C.

Furthermore, the mirror movement mechanism may move the reflection mirror 75 in a direction perpendicular to the objective optical axis P to change Area 10, which is located outside the objective optical axis, to a position close to or to a position away from Area 20, which is located on the objective optical axis P.

Furthermore, the mirror movement mechanism may move at least one of the dichroic mirror 73 and the reflection mirror 75 in the direction along the objective optical axis P and adjust the angles of the dichroic mirror 73 and the reflection mirror 75, thereby changing, in the depth direction, the focus position of the objective lens 7 in an illumination area of Area 10, which is located outside the objective optical axis.

Furthermore, in this embodiment, instead of aligning the focus positions in Area 10 and Area 20 by adjusting the positions and angles of the dichroic mirror 73 and the reflection mirror 75, it is also possible to perform switching control for the Z-positions in Area 10 and Area 20 by means of the inner focus lens 29.

In this case, as in the first embodiment, the user decides, in advance, respective Z-positions in Areas 10 and 20 while drivingly adjusting the inner focus lens 29 and obtains difference signals of Areas 10 and 20 in the Z-direction, from ETL drive signals corresponding to the Z-positions in Areas 10 and 20. Then, for each of Area 10 and Area 20, a difference signal of the corresponding Area 10 or 20 in the Z-direction is output from the control box 19 and is added to the ETL drive signal output from the control board 15. Accordingly, for each of Areas 10 and 20, the focus position can be sequentially changed in the Z-direction to perform three-dimensional observation.

In addition, it is also possible to detect the focus position in the specimen S by using the autofocus sensor 81, which is connected via the cube turret 33, and to input the signal thereof, as a difference signal, to a control signal for the inner focus lens 29. For example, in a case in which the specimen S is of a live mouse etc., although the focus varies due to the heartbeat, the focus position can be corrected by means of the sensor 81 and the inner focus lens 29.

When the switching control for the Z-position is performed for each of a plurality of areas on the specimen S outside the objective optical axis, a mechanical movement needs to be performed by means of the mirror movement mechanism; however, when the switching control for the Z-position is performed for each of an area on the specimen S outside the objective optical axis and an area thereon on the objective optical axis P by means of the inner focus lens 29, a mechanical movement is not required, thus requiring less time lag.

Furthermore, in this embodiment, it is also possible to further provide at least one other dichroic mirror (other beam splitter) that is disposed between the dichroic mirror 73 and the reflection mirror 75. In this case, laser light reflected by the dichroic mirror 73, which is disposed on the objective optical axis P, is split by the at least one other dichroic mirror into the direction along the objective optical axis P and the direction intersecting the objective optical axis P, and the laser light transmitted through the other dichroic mirror is reflected by the reflection mirror 75 toward an area on the specimen S outside the objective optical axis.

By doing so, an area located between an illumination area irradiated with laser light via the dichroic mirror 73, which is disposed on the objective optical axis P, and an illumination area irradiated with laser light via the reflection mirror 75 can also be irradiated with laser light via the at least one other dichroic mirror, simultaneously with these illumination areas. Therefore, at least three multiple areas including the field of view outside the objective optical axis can be simultaneously observed on the basis of fluorescence produced in the respective areas on the specimen S that are irradiated with the laser light.

In this modification, the mirror movement mechanism may rotate, together with the reflection mirror 75, the other dichroic mirror about the objective optical axis P, in synchronization with the rotation of the dichroic mirror 73 about the objective optical axis P. Furthermore, the mirror movement mechanism may move the other dichroic mirror in the direction intersecting the objective optical axis P. Furthermore, the mirror movement mechanism may move, in the direction along the objective optical axis P, at least one of: the reflection mirror 75 and the other dichroic mirror; and the dichroic mirror 73, which is disposed on the objective optical axis P, and may adjust the angles of the reflection mirror 75, the other dichroic mirror, and the dichroic mirror 73, thus changing, in the depth direction, the focus position of the objective lens 7 in illumination areas outside the objective optical axis.

Although the embodiments of the present invention have been described above in detail with reference to the drawings, the specific configurations are not limited to these embodiments, and design changes etc. that do not depart from the scope of the present invention are also encompassed. For example, the present invention is not limited to those applied to the above-described embodiments and modifications and can be applied to embodiments obtained by appropriately combining these embodiments and modifications, without particular limitation.

As a result, the following aspects are derived from the above-described embodiments.

According to a first aspect, the present invention provides a microscope system including: an objective lens that focuses, on a specimen, illumination light produced by a light source; an illumination-area switching unit that is disposed between the objective lens and the specimen and that switches an illumination area irradiated with the illumination light focused by the objective lens, among a plurality of illumination areas on the specimen outside the objective optical axis of the objective lens; and a variable-focus optical system that is disposed on the objective optical axis between the light source and the objective lens and that can change the focus position of the objective lens in a direction along the objective optical axis.

According to this aspect, the illumination-area switching unit switches the illumination area irradiated with the illumination light among a plurality of illumination areas on the specimen outside the objective optical axis of the objective lens, and thus, a plurality of areas including the field of view outside the objective optical axis can be rapidly switched among and observed on the basis of observation light produced in each of the respective areas, on the specimen, irradiated with the illumination light. Furthermore, the variable-focus optical system changes the focus position of the objective lens for each of the plurality of areas, thereby making it possible to three-dimensionally observe each of the plurality of areas. In this specification, "the focus position of the objective lens" does not mean a focus position that is determined by the optical system of the objective lens alone but means a focus position on the specimen that is determined by the whole optical system including the variable-focus optical system and the objective lens.

In the above-described aspect, the illumination-area switching unit may be provided with: a first mirror that is disposed on the objective optical axis and that reflects the illumination light focused by the objective lens, toward the outside of the objective optical axis; a second mirror that is disposed outside the objective optical axis and that reflects the illumination light reflected by the first mirror, toward the outside of the objective optical axis on the specimen; and a mirror movement mechanism that moves at least one of the first mirror and the second mirror while maintaining the light path of the illumination light therebetween.

With this configuration, the illumination-light illumination area on the specimen outside the objective optical axis can be changed with a simple configuration in which the mirror movement mechanism only moves at least one of the first mirror and the second mirror.

In the above-described aspect, the mirror movement mechanism may rotate the second mirror about the objective optical axis while rotating the first mirror about the objective optical axis.

With this configuration, the illumination-light illumination area on the specimen outside the objective optical axis can be changed around the objective optical axis by the mirror movement mechanism.

In the above-described aspect, the mirror movement mechanism may move the second mirror in a direction intersecting the objective optical axis.

With this configuration, the illumination-light illumination area on the specimen outside the objective optical axis can be changed in a direction intersecting the objective optical axis by the mirror movement mechanism.

In the above-described aspect, the first mirror and the second mirror may be provided in a manner allowing the angles thereof to be changed; and the mirror movement mechanism may move at least one of the first mirror and the second mirror in the direction along the objective optical axis.

With this configuration, the mirror movement mechanism moves at least one of the first mirror and the second mirror in the direction along the objective optical axis and adjusts the angles of the first mirror and the second mirror, thereby making it possible to change, in the depth direction, the focus position of the objective lens in the illumination area on the specimen outside the objective optical axis.

The above-described aspect may further include an insertion/removal-switching support portion that supports the illumination-area switching unit in a manner allowing the illumination-area switching unit to be inserted between the objective lens and the specimen and to be removed therefrom.

With this configuration, in a state in which the illumination-area switching unit is removed from between the objective lens and the specimen by the insertion/removal-switching support portion, illumination light from the light source is focused by the objective lens and is radiated onto an area on the specimen on the objective optical axis. On the other hand, in a state in which the illumination-area switching unit is inserted between the objective lens and the specimen by the insertion/removal-switching support portion, illumination light produced by the light source and focused by the objective lens is radiated onto an area on the specimen outside the objective optical axis by the illumination-area switching unit. Therefore, the illumination-light illumination area on the specimen can be switched between an area on the objective optical axis and a plurality of areas outside the objective optical axis, simply by switching between insertion and removal of the illumination-area switching unit.

In the above-described aspect, the variable-focus optical system may change the focus position in the direction along the objective optical axis, in synchronization with switching among the illumination areas outside the objective optical axis performed by the illumination-area switching unit.

With this configuration, the same positions, in the direction along the objective optical axis, in a plurality of areas can be observed by the variable-focus optical system. Furthermore, when the observation areas are switched, and the positions in the direction along the objective optical axis are changed by the variable-focus optical system, different positions, in the direction along the objective optical axis, in a plurality of areas can also be observed.

According to a second aspect, the present invention provides a microscope system including: an objective lens that focuses illumination light produced by a light source; and a light-path splitting unit that spatially splits the light path of the illumination light focused by the objective lens and that radiates the illumination light onto an area on a specimen on the objective optical axis of the objective lens and an area thereon outside the objective optical axis thereof.

According to the present invention, the light-path splitting unit spatially splits the light path of illumination light produced by the light source and focused by the objective lens, thereby simultaneously radiating the illumination light onto an area on the objective optical axis of the objective lens and an area outside the objective optical axis thereof. Therefore, areas including the field of view outside the objective optical axis can be simultaneously observed on the basis of observation light produced in the respective areas on the specimen that are irradiated with the illumination light.

In the above-described aspect, the light-path splitting unit may be provided with: a beam splitter that is disposed on the objective optical axis and that splits the light path of the illumination light focused by the objective lens into a direction along the objective optical axis and a direction intersecting the objective optical axis; a reflection mirror that reflects the illumination light split into the direction intersecting the objective optical axis by the beam splitter, toward the outside of the objective optical axis on the specimen; and a mirror movement mechanism that moves at least one of the beam splitter and the reflection mirror while maintaining the light path of the illumination light therebetween.

With this configuration, the illumination-light illumination area on the specimen outside the objective optical axis can be changed with a simple configuration in which the mirror movement mechanism only moves at least one of the beam splitter and the reflection mirror.

The beam splitter may have: a transmittance of about 50% with respect to a near-infrared wavelength region that corresponds to the wavelength of the illumination light for causing multiphoton excitation; a transmittance of 80% or higher with respect to one of short-wavelength-side multiphoton fluorescence and long-wavelength-side multiphoton fluorescence; and a transmittance of 20% or lower with respect to the other.

In the above-described aspect, the mirror movement mechanism may rotate the reflection mirror about the objective optical axis while rotating the beam splitter about the objective optical axis.

With this configuration, the illumination-light illumination area on the specimen outside the objective optical axis can be changed around the objective optical axis by the mirror movement mechanism.

The above-described aspect may further include a variable-focus optical system that is disposed on the objective optical axis between the light source and the objective lens and that can change the focus position of the objective lens in a direction along the objective optical axis.

With this configuration, the variable-focus optical system changes the focus position of the objective lens, thereby making it possible to simultaneously and three-dimensionally observe an area on the objective optical axis and an area outside the objective optical axis.

The above-described aspect may further include a variable-focus optical system that is disposed on the objective optical axis between the light source and the objective lens and that can change the focus position of the objective lens in the direction along the objective optical axis, wherein the variable-focus optical system may change the focus position in the direction along the objective optical axis, in synchronization with switching among illumination areas outside the objective optical axis performed by the mirror movement mechanism.

With this configuration, the same positions, in the direction along the objective optical axis, in a plurality of areas outside the objective optical axis can be observed by the variable-focus optical system. Furthermore, when the illumination areas are switched, and the position in the direction along the objective optical axis is changed by the variable-focus optical system, different positions, in the direction along the objective optical axis, in a plurality of areas outside the objective optical axis can also be observed.

In the above-described aspect, the mirror movement mechanism may move the reflection mirror in the direction intersecting the objective optical axis.

With this configuration, the illumination-light illumination area on the specimen outside the objective optical axis can be changed in the direction intersecting the objective optical axis by the mirror movement mechanism.

In the above-described aspect, the beam splitter and the reflection mirror may be provided in a manner allowing the angles thereof to be changed; and the mirror movement mechanism may move at least one of the beam splitter and the reflection mirror in the direction along the objective optical axis.

With this configuration, the mirror movement mechanism moves at least one of the beam splitter and the reflection mirror in the direction along the objective optical axis and adjusts the angles of the beam splitter and the reflection mirror, thereby making it possible to change, in the depth direction, the focus position of the objective lens in the illumination area on the specimen outside the objective optical axis.

The above-described aspect may further include at least one other beam splitter that is disposed between the beam splitter and the reflection mirror and that splits the illumination light split by the beam splitter into the direction intersecting the objective optical axis, into the direction along the objective optical axis and the direction intersecting the objective optical axis.

With this configuration, an area located between the illumination area on the specimen on the objective optical axis that is irradiated with illumination light via the beam splitter and the illumination area thereon that is irradiated with illumination light via the reflection mirror can also be irradiated with illumination light via the at least one other beam splitter, simultaneously with these illumination areas. Therefore, at least three multiple areas including the field of view outside the objective optical axis can be simultaneously observed on the basis of observation light produced in the respective areas on the specimen that are irradiated with the illumination light.

In the above-described aspect, the mirror movement mechanism may rotate, together with the reflection mirror, the other beam splitter about the objective optical axis, in synchronization with rotation of the beam splitter that is disposed on the objective optical axis about the objective optical axis.

With this configuration, the illumination area on the specimen outside the objective optical axis, the illumination area being irradiated with the illumination light via the other beam splitter, can be changed around the objective optical axis by the mirror movement mechanism.

In the above-described aspect, the mirror movement mechanism may move the other beam splitter in a direction intersecting the objective optical axis.

With this configuration, the illumination area on the specimen outside the objective optical axis, the illumination area being irradiated with the illumination light via the other beam splitter, can be changed in a direction intersecting the objective optical axis by the mirror movement mechanism.

In the above-described aspect, the reflection mirror, the other beam splitter, and the beam splitter that is disposed on the objective optical axis may be provided in a manner allowing the angles thereof to be changed; and the mirror movement mechanism may move, in the direction along the objective optical axis, at least one of: the reflection mirror and the other beam splitter; and the beam splitter that is disposed on the objective optical axis.

With this configuration, the mirror movement mechanism moves, in the direction along the objective optical axis, at least one of: the reflection mirror and the other beam splitter; and the beam splitter that is disposed on the objective optical axis and adjusts the angles of the reflection mirror, the other beam splitter, and the beam splitter that is disposed on the objective optical axis, thereby making it possible to change, in the depth direction, the focus positions of the objective lens in the illumination areas on the specimen outside the objective optical axis.

The above-described aspect may further include a microscope that includes a scanning unit for two-dimensionally scanning the illumination light focused by the objective lens, wherein the microscope may be a two-photon laser-scanning microscope, a laser-scanning microscope, or a disk-scanning confocal microscope.

With this configuration, detailed observation of the scanning range of illumination light scanned by the scanning unit can be realized for each of a plurality of areas.

The above-described aspect may further include an objective movement mechanism that can move the objective lens about at least one of a rotational axis parallel to the objective optical axis and a rotational axis intersecting the objective optical axis.

With this configuration, the objective movement mechanism moves the objective lens about at least one of the rotational axis parallel to the objective optical axis and the rotational axis intersecting the objective optical axis, thereby making it possible to observe each area on the specimen from different angles.

The above-described aspect may further include a detection unit that detects observation light produced in the illumination area on the specimen.

With this configuration, image information of each observation area on the specimen can be acquired on the basis of the luminance of observation light detected by the detection unit.

The above-described aspect may further include a display unit that simultaneously displays images of respective illumination areas acquired on the basis of the observation light detected by the detection unit.

With this configuration, respective observation areas on the specimen can be simultaneously observed on the display unit.

According to the present invention, an advantageous effect is afforded in that areas including at least the field of view outside the optical axis of the objective lens can be simultaneously observed or can be rapidly switched and observed.

REFERENCE SIGNS LIST 1, 70 microscope system
3 microscope
7 objective lens
9 illumination-area switching mechanism (illumination-area switching unit)
17 monitor (display unit)
21 scan unit (scanning unit)
29 inner focus lens (variable-focus optical system)
41 first mirror
43 second mirror
45 mirror movement mechanism
57 support post (insertion/removal-switching support portion)
61A, 61B external PMT (detection unit)
71 light-path splitting mechanism (light-path splitting unit)
73 dichroic mirror (beam splitter)
75 reflection mirror
79A, 79B PMT (detection unit)
S specimen
P objective optical axis

The invention claimed is:

1. A microscope system comprising:
an objective lens that is configured to focus, on a specimen, illumination light produced by a light source, the objective lens having an objective optical axis;
an illumination-area switching unit that is configured to be disposed between the objective lens and the specimen and that is configured to switch an illumination area irradiated with the illumination light focused by the objective lens, among a plurality of illumination areas on the specimen outside the objective optical axis; and
a variable-focus optical system that is disposed on an optical path between the light source and the objective lens and that is configured to change a focus position of the objective lens in a direction along the objective optical axis.

2. The microscope system according to claim 1, wherein the illumination-area switching unit comprises:
a first mirror that is configured to be disposed on the objective optical axis and that is configured to reflect the illumination light focused by the objective lens, toward an outside of the objective optical axis;
a second mirror that is disposed at the outside the objective optical axis and that is configured to reflect the illumination light reflected by the first mirror, toward the specimen at a position outside of the objective optical axis; and
a mirror movement mechanism that is configured to move at least one of the first mirror and the second mirror; and
wherein the first mirror, the second mirror, and the mirror movement mechanism are configured such that a light path of the illumination light between the first mirror and the second mirror is maintained when the mirror movement mechanism moves the at least one of the first mirror and the second mirror.

3. The microscope system according to claim 2, wherein the mirror movement mechanism is configured to rotate the first mirror and the second mirror about the objective optical axis.

4. The microscope system according to claim 2, wherein the mirror movement mechanism is configured to move the second mirror in a direction intersecting the objective optical axis.

5. The microscope system according to claim 2, wherein:
angles of the first mirror and the second mirror are changeable; and
the mirror movement mechanism is configured to move the at least one of the first mirror and the second mirror in the direction along the objective optical axis.

6. The microscope system according to claim 3, wherein the mirror movement mechanism is configured to move the second mirror in a direction intersecting the objective optical axis.

7. The microscope system according to claim 3, wherein:
angles of the first mirror and the second mirror are changeable; and
the mirror movement mechanism is configured to move at least one of the first mirror and the second mirror in the direction along the objective optical axis.

8. The microscope system according to claim 1, further comprising:
an insertion/removal-switching support portion that supports the illumination-area switching unit;
wherein the illumination-area switching unit is insertable into and removable from a position between the objective lens and the specimen.

9. The microscope system according to claim 1, wherein the variable-focus optical system is configured to change the focus position of the objective lens in the direction along the objective optical axis, in synchronization with switching among the illumination areas outside the objective optical axis performed by the illumination-area switching unit.

10. The microscope system according to claim 1, further comprising:
a microscope that includes the light source and a scanning unit configured to two-dimensionally scan the illumination light focused by the objective lens;
wherein the microscope is a two-photon laser-scanning microscope, a laser-scanning microscope, or a disk-scanning confocal microscope.

11. The microscope system according to claim 1, further comprising an objective movement mechanism that is configured to move the objective lens about at least one of a rotational axis parallel to the objective optical axis and a rotational axis intersecting the objective optical axis.

12. The microscope system according to claim 1, further comprising a detection unit that is configured to detect observation light produced in one of the illumination areas on the specimen which is irradiated with the illumination light focused by the objective lens.

13. The microscope system according to claim 12, further comprising a display unit that simultaneously displays images of respective illumination areas acquired based on observation light produced in the illumination areas and detected by the detection unit.

14. A microscope system comprising:
an objective lens that is configured to focus illumination light produced by a light source, the objective lens having an objective optical axis; and
a light-path splitting unit configured to be arranged between the objective lens and a specimen, the light-path splitting unit being configured to spatially split a light path of the illumination light focused by the objective lens and to radiate the illumination light onto an area on the specimen on the objective optical axis and onto an area on the specimen outside the objective optical axis.

15. The microscope system according to claim 14, wherein the light-path splitting unit comprises:
 a beam splitter that is configured to be disposed on the objective optical axis and that is configured to split the light path of the illumination light focused by the objective lens into a direction along the objective optical axis and a direction intersecting the objective optical axis;
 a reflection mirror that is configured to reflect the illumination light split into the direction intersecting the objective optical axis by the beam splitter, toward the specimen at a position outside of the objective optical axis; and
 a movement mechanism that is configured to move at least one of the beam splitter and the reflection mirror; and
 wherein the beam splitter, the reflection mirror, and the movement mechanism are configured such that a light path of the illumination light between the beam splitter and the reflection mirror is maintained when the movement mechanism moves the at least one of the beam splitter and the reflection mirror.

16. The microscope system according to claim 15, wherein the beam splitter has:
 a transmittance of about 50% with respect to a near-infrared wavelength region that includes a wavelength of the illumination light for causing multiphoton excitation;
 a transmittance of 80% or higher with respect to one of short-wavelength-side multiphoton fluorescence and long-wavelength-side multiphoton fluorescence; and
 a transmittance of 20% or lower with respect to the other of the short-wavelength-side multiphoton fluorescence and the long-wavelength-side multiphoton fluorescence.

17. The microscope system according to claim 15, wherein the movement mechanism is configured to rotate the beam splitter and the reflection mirror about the objective optical axis.

18. The microscope system according to claim 17, further comprising:
 a variable-focus optical system that is disposed on an optical path between the light source and the objective lens and that is configured to change a focus position of the objective lens in the direction along the objective optical axis,
 wherein the variable-focus optical system is configured to change the focus position of the objective lens in the direction along the objective optical axis, in synchronization with switching among illumination areas outside the objective optical axis performed by the movement mechanism.

19. The microscope system according to claim 17, wherein the movement mechanism is configured to move the reflection mirror in the direction intersecting the objective optical axis.

20. The microscope system according to claim 17, wherein:
 angles of the beam splitter and the reflection mirror are changeable; and
 the movement mechanism is configured to move at least one of the beam splitter and the reflection mirror in the direction along the objective optical axis.

21. The microscope system according to claim 15, wherein the movement mechanism is configured to move the reflection mirror in the direction intersecting the objective optical axis.

22. The microscope system according to claim 15, wherein:
 angles of the beam splitter and the reflection mirror are changeable; and
 the movement mechanism is configured to move the at least one of the beam splitter and the reflection mirror in the direction along the objective optical axis.

23. The microscope system according to claim 15, further comprising at least one other beam splitter that is disposed between the beam splitter and the reflection mirror and that is configured to split off the illumination light split by the beam splitter into the direction along the objective optical axis and the direction intersecting the objective optical axis.

24. The microscope system according to claim 23, wherein the movement mechanism is configured to rotate the reflection mirror and the other beam splitter about the objective optical axis, in synchronization with rotation of the beam splitter that is configured to be disposed on the objective optical axis about the objective optical axis.

25. The microscope system according to claim 23, wherein the movement mechanism is configured to move the other beam splitter in the direction intersecting the objective optical axis.

26. The microscope system according to claim 23, wherein:
 angles of the reflection mirror, the other beam splitter, and the beam splitter that is configured to be disposed on the objective optical axis are changeable; and
 the movement mechanism is configured to move, in the direction along the objective optical axis, at least one of the reflection mirror, the other beam splitter; and the beam splitter that is configured to be disposed on the objective optical axis.

27. The microscope system according to claim 14, further comprising a variable-focus optical system that is disposed on an optical path between the light source and the objective lens and that is configured to change a focus position of the objective lens in a direction along the objective optical axis.

28. The microscope system according to claim 14, further comprising:
 a microscope that includes the light source and a scanning unit configured to two-dimensionally scan the illumination light focused by the objective lens;
 wherein the microscope is a two-photon laser-scanning microscope, a laser-scanning microscope, or a disk-scanning confocal microscope.

29. The microscope system according to claim 14, further comprising an objective movement mechanism that is configured to move the objective lens about at least one of a rotational axis parallel to the objective optical axis and a rotational axis intersecting the objective optical axis.

30. The microscope system according to claim 14, further comprising a detection unit that is configured to detect observation light produced in the illumination areas on the specimen.

31. The microscope system according to claim 30, further comprising a display unit that simultaneously displays images of the respective illumination areas acquired based on the observation light produced in the illumination areas and detected by the detection unit.

* * * * *